United States Patent [19]

Smith et al.

[11] 4,162,168
[45] Jul. 24, 1979

[54] REFRACTORY MATERIAL

[75] Inventors: Russell D. Smith, Midland; R. James Bushong, Gladwin, both of Mich.

[73] Assignee: The Dow Chemical Company, Midland, Mich.

[21] Appl. No.: 747,278

[22] Filed: Dec. 3, 1976

[51] Int. Cl.² ............................................. C04B 35/04
[52] U.S. Cl. ........................................ 106/58; 106/60; 106/62; 106/69
[58] Field of Search .................... 106/58, 60, 62, 69

[56] References Cited

U.S. PATENT DOCUMENTS

| | | | |
|---|---|---|---|
| 3,364,043 | 1/1968 | Davies | 106/58 |
| 3,473,939 | 10/1969 | Mayberry et al. | 106/58 |
| 3,715,222 | 2/1973 | Hieb | 106/58 |
| 3,754,951 | 8/1973 | Coatney | 106/58 |
| 3,833,390 | 9/1974 | Staut et al. | 106/58 |
| 3,954,485 | 5/1976 | Coatney | 106/58 |
| 4,010,039 | 3/1977 | de Aza et al. | 106/58 |

Primary Examiner—L. Dewayne Rutledge
Assistant Examiner—John P. Sheehan

[57] ABSTRACT

A refractory grain material consisting essentially of at least about 97 percent by weight MgO grains, from about 1 to about 3 percent by weight of a combination of CaO, $SiO_2$, and $Al_2O_3$, and up to about 1 percent by weight of at least one oxide selected from the group consisting of $Fe_2O_3$ and $B_2O_3$ wherein the relative amounts of CaO, $SiO_2$ and $Al_2O_3$ are controlled so that a solid ternary compound of CaO-$SiO_2$-$Al_2O_3$ is present between the MgO grains.

9 Claims, 1 Drawing Figure

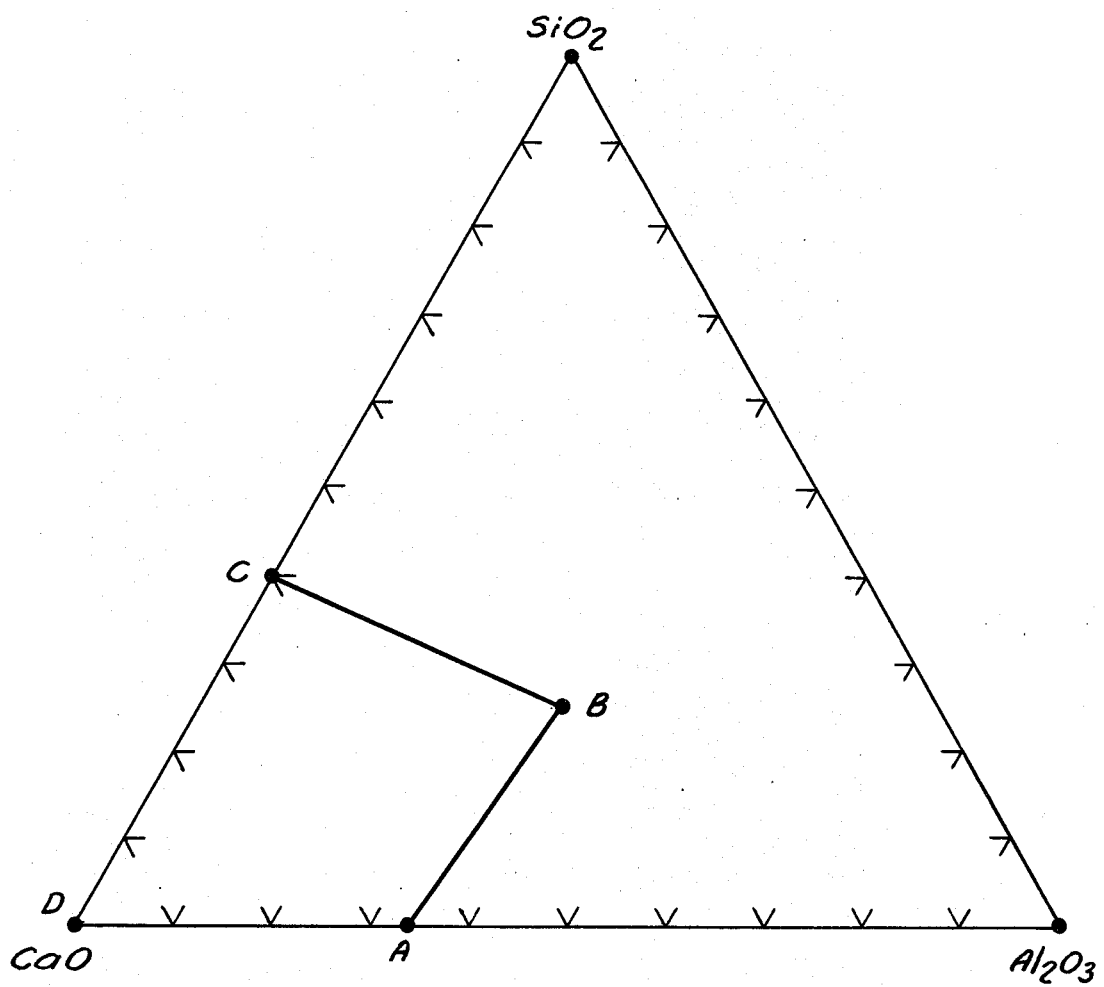

REFRACTORY MATERIAL

BACKGROUND OF THE INVENTION

The present invention relates to a refractory material, and more in particular to a refractory grain material containing MgO.

In the operation of many high temperature industrial processes, such as basic oxygen steel-making, the use of refractory material containing a large portion of ceramically bonded (dead-burned) crystalline MgO particles (periclase grains) has been increasing due to its ability to withstand the high temperatures typically employed in such furnaces.

Generally, refractory grain MgO is prepared from magnesium compounds as magnesium hydroxide or magnesium carbonate by (a) thermal decomposition of the magnesium compound to form an "activated" MgO, followed by (b) densification of the MgO to form the refractory material. One common method of decomposition and densification involves drying the magnesium compound to remove free water, calcining the magnesium compound at a temperature of from about 500° to about 1100° C. to form the "activated" MgO powder, pressing the MgO powder into pellets, and sintering the pellets at a temperature of about 1500° C. to form refractory grain MgO.

It is well-known that sintering becomes very difficult as the purity of the MgO becomes higher. In order to overcome this difficulty, the level of small amounts of impurities such as lime, alumina, iron oxide, and silica contained in the starting material have been adjusted. While the adjustment of the impurity levels may result in improved sintering, oftentimes it can also have a detrimental effect on the overall refractoriness of the sintered material. In this context refractoriness is defined as the capability of a refractory material to maintain a predetermined degree of chemical and physical identity at high temperatures and in the environment and conditions of use.

A number of prior art processes have attempted to improve the refractoriness of the MgO grains by maintaining a predetermined $CaO/SiO_2$ ratio and by additions of other refractory oxides of such metals as aluminum, lithium, manganese, potassium, sodium, titanium, vanadium, zirconium and the like. Typical processes are illustrated in U.S. Pat. Nos. 3,540,898 3,582,373, 3,713,855 and 3,754,951.

Although refractory MgO made according to the above processes may show acceptable refractoriness, there is a need in the market place for an improved refractory grain material with a high MgO content and enhanced high temperature compressive strength. These and other desired characteristics are achieved in the present invention.

SUMMARY OF THE INVENTION

The present invention is a refractory grain material consisting essentially of at least about 97 percent by weight MgO grains, from about 1 to about 3 percent by weight of a combination of CaO, $SiO_2$, and $Al_2O_3$, and up to about 1 percent by weight of at least one oxide selected from the group consisting of $Fe_2O_3$ and $B_2O_3$. The relative amounts of CaO, $SiO_2$, and $Al_2O_3$ are controlled so that a solid ternary compound of $CaO-SiO_2-Al_2O_3$ is present between the MgO grains. The compound is further characterized as being within the area bounded by A-B-C-D in the Figure, which points A-B-C-D represent the following composition

| Point | % CaO | % $SiO_2$ | % $AlO_2$ |
|---|---|---|---|
| A | 67 | 0 | 33 |
| B | 40 | 25 | 35 |
| C | 60 | 40 | 0 |
| D | 100 | 0 | 0 |

The relative proportions of CaO, $SiO_2$ and $Al_2O_3$ present in the refractory grain material are controlled by the addition prior to sintering of at least one substance selected from the group consisting of CaO, a calcium compound thermally decomposable to CaO, $SiO_2$, a silicon compound thermally decomposable to $SiO_2$, $Al_2O_3$, an aluminum compound thermally decomposable to $Al_2O_3$, and binary or ternary compounds of CaO, $Al_2O_3$ and $SiO_2$ in a sufficient amount to form between the MgO grains a solid ternary compound of $CaO-SiO_2-AlO_2$ characterized as having the composition indicated above.

For the purposes of the specification, all percentages are expressed as percent by weight of the final refractory grain MgO material, unless otherwise indicated.

BRIEF DESCRIPTION OF THE DRAWING

The single FIGURE shown in the drawing is a ternary-phase diagram of a $CaO-SiO_2-Al_2O_3$ system indicating the composition range of the present invention.

DESCRIPTION OF THE PREFERRED EMBODIMENT

The phase diagram depicted in the drawing is a two dimensional triangular representation of the phase behavior of the three component $CaO-SiO_2-Al_2O_3$ system. The apices of the triangle labeled CaO, $SiO_2$ and $Al_2O_3$ correspond to the pure component CaO, $SiO_2$ and $Al_2O_3$. The side of the triangle opposite each apex indicates the absence of that component. Thus horizontal lines across the triangle show increasing percentages of a component from 0 at the base to 100 percent at the apex. From the three composition scales of the diagram, the composition corresponding to any point in the interior of the triangle can be determined.

The points A, B, C, D define an area, the interior of which includes compositions in accordance with the present invention. As is appreciated by those skilled in the art, compositions within the scope of the present invention also include MgO.

Refractory grain MgO (periclase) in accordance with the present invention can be made by various techniques of calcination and sintering of source material well-known to those skilled in the art. Generally any magnesium compound which can be thermally decomposed to MgO by calcination, such as magnesium hydroxide or magnesium carbonate, can be used as the source material. The source material normally also contains various impurities generally associated with the commerically pure magnesium compound. These impurities include the oxides of silicon, calcium, aluminum, iron and boron.

It has now been discovered that by controlling the relative amounts of CaO, $SiO_2$, and $Al_2O_3$ present in the grain boundaries between refractory MgO grains, a refractory grain Mg0 material having improved compressive strength, especially at high temperatures, and especially at temperatures above 1500° C. can be produced.

The improved refractory grain material contains at least about 97 percent by weight MgO grains, from about 1 to about 3 percent by weight of a combination of CaO, $SiO_2$ and $Al_2O_3$ and up to about 1 percent by weight of at least one oxide selected from the group consisting of $Fe_2O_3$ and $B_2O_3$ oxide. More preferably, the refractory grain material contains at least about 97 percent by weight MgO grains, from about 1 to about 2 percent by weight of a combination of CaO, $SiO_2$ and $Al_2O_3$, and up to about ¾ percent by weight of at least one oxide selected from the group consisting of $Fe_2O_3$ and $B_2O_3$. Most preferably, the refractory grain material contains less than about 1/5 percent by weight $B_2O_3$. The refractory grain material preferably contains substantially only MgO, CaO, $SiO_2$, $Al_2O_3$, $Fe_2O_3$ and $B_2O_3$ in the percentages indicated above to the exclusion of other oxides, such as sodium oxide, lithium oxide, potassium oxide and the like.

The relative amounts of CaO, $SiO_2$ and $Al_2O_3$ present in the refractory grain material of the present invention are controlled so that a solid ternary compound of $CaO$-$SiO_2$-$Al_2O_3$ is present in the grain boundaries between the MgO grains. Preferably, the $CaO$-$SiO_2$-$Al_2O_3$ compound is uniformly disposed throughout the MgO grain boundaries as can be readily determined by analysis techniques well-known to those skilled in the art, such as electron microscopy. However, the ternary compound can also be in random distribution through the MgO grain boundaries. Preferably the solid ternary compound of $CaO$-$SiO_2$-$Al_2O_3$ is present between the MgO grains to the exclusion of other solid compounds which can have a tendency to reduce the compressive strength of the refractory grain MgO at the testing temperature.

The ternary compound of $CaO$-$SiO_2$-$Al_2O_3$ formed between the MgO grains is characterized as being within the interior of the area bounded by the points A-B-C-D in the Figure.

Also within the scope of the present invention are magnesium compounds which are thermally decomposable to the refractory grain MgO material disclosed above.

In the production of the refractory grain MgO material, the relative proportions of the CaO, $SiO_2$ and $Al_2O_3$ present in the refractory grain MgO (periclase) are controlled by adding, prior to sintering, at least one substance chosen from the group consisting of CaO, a calcium compound thermally decomposable to CaO, $SiO_2$, a silicon compound thermally decomposable to $SiO_2$, $Al_2O_3$, an aluminum compound thermally decomposable to $Al_2O_3$, and binary or ternary compounds of CaO, $SiO_2$ and $Al_2O_3$. More preferably, the relative proportions of CaO, $SiO_2$ and $Al_2O_3$ are controlled by adding, prior to sintering, substantially only $Al_2O_3$ or a compound thermally decomposable to $Al_2O_3$.

Calcium compounds thermally decomposable to CaO can include, for example, calcium hydroxide $Ca(OH)_2$, calcium carbonate $CaCO_3$ or the like. Silicon compounds thermally decomposable to $SiO_2$ can include silica or diatomaceous earth or the like. Aluminum compounds thermally decomposable to $Al_2O_3$ can include, for example, aluminum hydroxide $Al(OH)_3$ or the like. Compounds of CaO, $SiO_2$ and $Al_2O_3$ can include two component binary systems such as $CaO.SiO_2$ (pseudowollastonite), $3CaO.2SiO_2$ (ramkinite), $3Al_2O_3.2SiO_2$ (mullite), $3CaO.Al_2O_3$ or the like; or three component ternary systems such as $CaO.Al_2O_3.2SiO_2$ (anorthite), $2CaO.Al_2O_3.SiO_2$ (gehlenite), or the like.

Whatever substance is chosen, sufficient amounts are added to form in the grain boundaries between the MgO grains of the sintered product, a solid ternary compound of $CaO$-$SiO_2$-$Al_2O_3$ characterized as having a composition within the area bounded by the points A, B, C, D, in the Figure. The resulting refractory grain MgO material has a compresive strength at 1540° C. of at least about 1000 pounds per square inch.

Since some magnesium compounds which are thermally decomposable to a refractory grain MgO material can initially contain CaO, $SiO_2$ and $Al_2O_3$ as impurities, the relative amount of each ingredient can optionally be controlled by (1) adding amounts of each ingredient or a compound thermally decomposable to an ingredient to the magnesium compound or (2) by removing such ingredients from the magnesium compound, preferably prior to the formation of the magnesium compound or (3) by a combination of both (1) and (2). However, preferably the ingredient or a compound thermally decomposable to an ingredient is added to the magnesium compound. Generally, the addition is by admixing the ingredient with the magnesium compound prior to calcining. Alternatively, the ingredient can be admixed with MgO following calcination but prior to sintering. Removal of undesirable ingredients can generally be achieved by controlling the reaction conditions used in forming the magnesium compound. For example, the level of CaO can be controlled during the precipitation of $Mg(OH)_2$ by well known techniques.

In the practice of the present process rather than starting with a suitable magnesium compound, magnesium oxide containing at least about 97 percent by weight MgO can be used. In this embodiment the control of the amounts of CaO, $SiO_2$ and $Al_2O_3$ is also achieved by suitable additions or deletions of ingredients as discussed above.

The instant invention will be more fully understood by the following examples, which illustrate the production of refractory grain MgO in accordance with the present invention.

EXAMPLES

All the compositions according to this invention were prepared from a $Mg(OH)_2$ slurry containing 48.8 percent by weight water (about 139.4 g), 50.7 percent by weight magnesium hydroxide (about 145 g) and 0.5 percent by weight of impurities (about 1.4 g) generally associated with commercially pure $Mg(OH)_2$, such as $SiO_2$, CaO, $Al_2O_3$, $Fe_2O_3$ and $B_2O_3$. Each of the sample slurries was admixed with the particulate additive shown below:

| Example | Additive |
| --- | --- |
| 1 | 0.100g $Al_2O_3$ |
| 2 | 0.210g $Al_2O_3$ |
| 3 | 0.023g $Ca(OH)_2$ and 0.082g $Al_2O_3$ |
| 4 | 0.047g $Ca(OH)_2$ and 0.164g $Al_2O_3$ |
| 5 | 0.050g $SiO_2$ |
| 6 | 0.650g CaO |
| A | 0.525g $SiO_2$ and 0.330g $Al_2O_3$ |

The magnesium hydroxide contained particles having their longest dimension from about 14 microns to about 0.6 micron. The particulate additives contained particles having their longest dimension from about 37 microns to about 1 micron.

The mixture of magnesium hydroxide slurry and additives was oven dried to remove about 95 percent by weight of the free water present. The dried mixture was ground with a blender and calcined at 900° C. for 2 hours to produce a magnesium oxide material. The calcined magnesium oxide material was allowed to cool to room temperature and then was pressed at 15,000 psi into 1¼ inch diameter pellets weighing 12 grams.

The pellets were sintered in a furnace at 1540° C., under one atmosphere of air, for 3 hours to produce the refractory grain MgO having the composition shown below:

| Ex. | MgO(%) | CaO—SiO$_2$—Al$_2$O$_3$(%) | Fe$_2$O$_3$ plus B$_2$O$_3$(%) |
|---|---|---|---|
| 1 | 98.52 | 1.19 | 0.29 |
| 2 | 97.25 | 2.58 | 0.17 |
| 3 | 98.42 | 1.24 | 0.34 |
| 4 | 98.32 | 1.34 | 0.34 |
| 5 | 98.48 | 1.18 | 0.34 |
| 6 | 97.88 | 1.78 | 0.34 |
| A | 98.02 | 1.67 | 0.31 |

The relative amounts of each of CaO, SiO$_2$, and Al$_2$O$_3$ present in the CaO-SiO$_2$-Al$_2$O$_3$ compound is shown below:

| Example | CaO(%) | SiO$_2$(%) | Al$_2$O$_3$(%) |
|---|---|---|---|
| 1 | 45.1 | 34.4 | 20.5 |
| 2 | 75.2 | 15.5 | 9.3 |
| 3 | 50.1 | 17.7 | 32.2 |
| 4 | 47.8 | 29.8 | 22.4 |
| 5 | 50.9 | 38.1 | 11.0 |
| 6 | 70.2 | 22.5 | 7.3 |
| A | 31.1 | 46.1 | 22.8 |

Example A falls outside the scope of the invention and is included for comparison purposes only.

The refractory grain MgO samples were crushed and ball milled to −325 U.S. Standard mesh material. About 98 percent by weight of the crushed MgO was mixed with 0.5 percent by weight of ammonium ligno-sulfonate (Orzan ®) and 1.5 percent by weight H$_2$O. Ten grams of this mixture were pressed into pellets at 17,500 psi in a ½ inch diameter die. The pellets were fired in a gas fired furnace at 1700° C., 1 atmosphere pressure, for 3 hours. Five pellets were then placed in a Harrop MOR furnace and heated to 1540° C. and the compressive strength was determined.

The compressive strength of the refractory grain MgO samples was determined in a testing furnace equipped with a hydraulic ram which applied a known pressure upon the dead burned periclase pellet until the pellet broke. The compressive strength of each of the samples was as follows:

| Example | Compressive Strength (psi at 1540° C.) |
|---|---|
| 1 | 2025 |
| 2 | 4530 |
| 3 | 1898 |
| 4 | 1380 |
| 5 | 1283 |
| 6 | 3356 |
| A | 576 |

The above examples show the importance of the compositional limits which is imposed on each of CaO, SiO$_2$ and Al$_2$O$_3$.

As it is apparent from the foregoing specification the present invention is susceptible of being embodied with various alterations and modifications which may differ particularly from those that have been described in the preceding specification and description. For this reason it is to be fully understood that all the foregoing is intended to be merely illustrative and is not to be construed or interpreted as being restrictive or otherwise limiting of the present invention, except as is set forth and defined in the hereto appended claims.

What is claimed is:

1. A refractory grain material consisting essentially of at least about 97 percent by weight MgO grains, from about 1 to about 3 percent by weight of a combination of CaO, SiO$_2$, and Al$_2$O$_3$, and up to about 1 percent by weight of at least one oxide selected from the group consisting of Fe$_2$O$_3$ and B$_2$O$_3$, wherein the relative amounts of CaO, SiO$_2$ and Al$_2$O$_3$ are controlled so that a solid ternary compound of CaO-SiO$_2$-Al$_2$O$_3$ is present between the MgO grains, said compound further characterized as being within the area bounded by points A-B-C-D in the Figure, which points A-B-C-D represent the following composition:

| Point | % CaO | % SiO$_2$ | % Al$_2$O$_3$ |
|---|---|---|---|
| A | 67 | 0 | 33 |
| B | 40 | 25 | 35 |
| C | 60 | 40 | 0 |
| D | 100 | 0 | 0 |

2. The refractory grain material of claim 1 wherein the compound is present in an amount of from about 1 to about 2 percent by weight.

3. The refractory grain material of claim 1 wherein the compound is substantially uniformly distributed between the MgO grains.

4. The refractory grain material of claim 1 wherein the material has a compressive strength at 1540° C. of at least 1000 pounds per square inch.

5. The refractory grain material of claim 1 wherein MgO, CaO, SiO$_2$, Al$_2$O$_3$ and at least one oxide selected from the group consisting of Fe$_2$O$_3$ and B$_2$O$_3$ are present to the exclusion of other oxides.

6. The refractory grain material of claim 1 wherein the compound is present between the MgO grains to the exclusion of other solid compounds.

7. In a process of producing a refractory grain material consisting essentially of at least about 97 percent by weight MgO grains, from about 1 to about 3 percent by weight of a combination of CaO, SiO$_2$ and Al$_2$O$_3$ and up to about 1 percent by weight of at least one oxide selected from the group consisting of Fe$_2$O$_3$ and B$_2$O$_3$, said process including the steps of calcining a magnesium compound to form magnesium oxide and sintering said magnesium oxide to form refractory grain MgO, the improvement comprising controlling the relative proportions of the CaO, SiO$_2$ and Al$_2$O$_3$ present in the refractory grain MgO by adding prior to sintering, at least one substance chosen from the group consisting of Al$_2$O$_3$, an aluminum compound thermally decomposable to Al$_2$O$_3$ in a sufficient amount to form between the MgO grains a solid ternary compound of CaO-SiO$_2$-Al$_2$O$_3$, said compound further characterized as being within the area bounded by the points A-B-C-D in the figure, which points A-B-C-D represent the following composition:

| Point | % CaO | % SiO$_2$ | % Al$_2$O$_3$ |
|-------|-------|-----------|---------------|
| A | 67 | 0 | 33 |
| B | 40 | 25 | 35 |
| C | 60 | 40 | 0 |
| D | 100 | 0 | 0 |

(table continued from previous column)

8. The improvement of claim 7 wherein the substance is added by admixing the substance with the magnesium compound prior to calcining.

9. The improvement of claim 7 wherein the substance is added by admixing the substance with the magnesium oxide following calcining.

* * * * *

UNITED STATES PATENT AND TRADEMARK OFFICE
CERTIFICATE OF CORRECTION

PATENT NO. : 4,162,168
DATED : July 24, 1979
INVENTOR(S) : Russell D. Smith and R. James Bushong It is certified that error appears in the above-identified patent and that said Letters Patent are hereby corrected as shown below:

On the cover page, under "References Cited", delete "3,954,485" and insert --3,954,488--.

In Col. 1, line 48, insert a comma --,-- after the number "3,540,898".

In Col. 2, line 61, delete "commerically" and insert --commercially--.

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*